(12) United States Patent
Fakhari

(10) Patent No.: US 9,531,172 B1
(45) Date of Patent: Dec. 27, 2016

(54) COMPOSITE BOARD WITH INTEGRAL ELECTRICAL WIRING

(71) Applicant: ALF Operating Partners, Ltd., Fort Worth, TX (US)

(72) Inventor: M. John Fakhari, Fort Worth, TX (US)

(73) Assignee: ALF OPERATING PARTNERS, LTD., Fort Worth, TX (US)

( * ) Notice: Subject to any disclaimer, the term of this patent is extended or adjusted under 35 U.S.C. 154(b) by 100 days.

(21) Appl. No.: 14/601,886

(22) Filed: Jan. 21, 2015

Related U.S. Application Data

(60) Provisional application No. 61/910,729, filed on Dec. 2, 2013.

(51) Int. Cl.
*B65D 19/38* (2006.01)
*H02G 3/02* (2006.01)

(52) U.S. Cl.
CPC ...................................... *H02G 3/02* (2013.01)

(58) Field of Classification Search
CPC ....................................................... H02G 3/02
USPC ............................................................ 428/119
See application file for complete search history.

(56) References Cited

U.S. PATENT DOCUMENTS

| | | |
|---|---|---|
| 6,588,732 B1 | 7/2003 | Caceres et al. |
| 6,659,020 B1 * | 12/2003 | Ball ................ B29C 47/0038 108/57.28 |
| 7,322,564 B2 | 1/2008 | Fakhari |
| 7,810,277 B2 | 10/2010 | Fakhari |
| 8,354,048 B2 | 1/2013 | Caceres et al. |

\* cited by examiner

*Primary Examiner* — Brent O'Hern
(74) *Attorney, Agent, or Firm* — Erickson Kernell IP, LLC

(57) ABSTRACT

A board fabricated from a composite material that can be used to build a structure. Electrical conductors may be embedded into the board to distribute electric power to electrically powered devices attached to the board. The board may further comprise elongated supports that can be used to partially enclose threaded fasteners. A plurality of cavities may be formed above the supports so that a fastener head can be recessed into each cavity to allow for a relatively planar upper surface.

14 Claims, 5 Drawing Sheets

COMPOSITE BOARD WITH INTEGRAL ELECTRICAL WIRING

CROSS-REFERENCE TO RELATED APPLICATION

This application claims the benefit of U.S. Provisional Patent Application No. 61/910,729, filed Dec. 2, 2013 entitled COMPOSITE BOARD WITH INTEGRAL ELECTRICAL WIRING, the disclosure of which is hereby incorporated herein in its entirety by reference.

BACKGROUND OF THE INVENTION

1. Field of the Invention

This invention relates to boards used in construction. More specifically, boards made from a composite material and having integral electrical wiring.

2. Background & Description of the Related Art

Wooden boards, or lumber, are one of the most popular and cost effective building materials currently available for the construction of buildings or other structures and are particularly well adapted for use as decking material. Wooden boards come in various shapes and sizes and they can be fastened together as necessary during the construction process to form a structure. Wooden boards are popular because they can be cut to any shape or length desired and they can be fastened together using many different types of fasteners (e.g., nails, screws, bolts, etc.). Also, wooden boards are sufficiently strong to support the relatively heavy loads encountered when building a structure.

Using boards made out of wood does, however, have a number of drawbacks. First, environmental conditions such as moisture and temperature can have a significant impact on the physical integrity of the board. Because wood is an organic substance, it may decay or rot when temperature and humidity are such that fungi within the wood are allowed to propagate. Second, because wooden boards are cut from trees, the boards contain physical imperfections (e.g., knots, voids, etc.) that were present in the tree. These imperfections can result in boards being inconsistent in terms of strength and aesthetics. Boards of reduced strength can pose a threat to the structural integrity of a structure in which the boards are installed. A final drawback of using wooden boards is that wood is prone to fading and cracking over time, which could detract from the aesthetic appeal of the built structure.

Because of these drawbacks, manufacturers have started producing boards fashioned from composite material such as wood plastic composite (WPC) and fiber reinforced polymer or resin (occasionally referred to as FRP or fiberglass). WPC boards generally comprise wood fibers bonded with a thermoplastic and inorganic filler material. The result is a board that has some of the physical and aesthetic qualities of wood but better durability and consistency due to the thermoplastic and filler material. Fiberglass boards, on the other hand, typically have no wood fibers and consist of non-organic reinforcing fibers bonded by a thermoset resin. Fiberglass boards can be made using a pultrusion process which involves pulling reinforcing fibers or matting through a vat of resin and then through a heated die where the resin cures or sets and encases the fibers.

Because much or all of the material in a composite board is not organic, the boards are less likely to deteriorate than a board made entirely of wood. Also, composite boards have more consistent structural properties and strength because the boards are fabricated in a controlled setting such as a manufacturing facility rather than simply cut from trees.

Many of the manufacturers selling composite board products market them specifically for outdoor walkways and decks. Companies that manufacture WPC decking include Trex Company (www.trex.com) and ChoiceDek (www.choicedek.com). Manufacturers of fiberglass decking include Strongwell (www.strongwell.com) and McNichols (www.mcnichols.com).

A problem with the boards or decking used today, whether made of wood or composite material, is that they do not allow for easy installation of lighting or other electrically powered devices in the structure being built. To install an electrical system, generally a contractor must first build the structure and then tediously run and attach electrical wiring to the structure such that the wiring is concealed within or behind the structure. This can result in significant time and expense on top of the basic construction of the structure. What is needed in the industry is a composite board, with the durability benefits mentioned above, that has a means for easily installing an electrical system without the added step of installing a significant amount of electrical wiring.

SUMMARY OF THE INVENTION

The present invention is directed to a board that can be used to build a structure. A primary use of the structure would be a walkway or deck, however the present invention may be used to build almost any structure a wooden board could be used to build. The boards of the present invention can be used individually or as a group, with several boards being attached to a frame to become part of a built structure. The board has a body formed from a composite material such as fiber reinforced resin or fiberglass. The body has an upper surface or face and the board has at least two electrical conductors embedded in the body below the upper surface. The conductors are embedded in the body during the formation of the body. Finally, the board is generally used in combination with at least one electrically powered device, such as a light, secured to the body that contacts the electrical conductors and receives electrical power through at least one of the conductors.

The body may also comprise a plank section with an upper surface or face. There may be a plurality of cavities formed in the plank section with each cavity being defined by walls extending inward from the face. Each cavity can be configured to contain the head of at least one fastener completely in the cavity. Additionally, the body may have a plurality of supports or legs integrally formed with the bottom of the plank section with the supports projecting from the plank section in a direction opposite the face. The supports are for supporting the plank section in spaced relation to the frame upon which the board may be mounted. The board may be secured to the frame by fastening at least one of the supports to the frame.

BRIEF DESCRIPTION OF THE DRAWINGS

FIG. 6b is a greatly enlarged side view of the power supply clip in FIG. 6a.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," "leftwardly," "upper," and "lower" will refer to the installed position of the item to which the reference is made. The words "inwardly" and "outwardly" will refer to directions toward and away from, respectively, the geometric center of the embodiment being described and designated parts thereof. Said terminology will include the words specifically mentioned, derivatives thereof and words of a similar import. It is further understood that terminology such as the aforementioned directional phrases may be used to describe the preferred embodiment as it is shown in the figures herein, specifically in an upward facing horizontal position. This is for convenience only as it is understood the preferred embodiment, or any embodiment, may also be used vertically, at an angle, or in a downward facing position.

Figure 1:
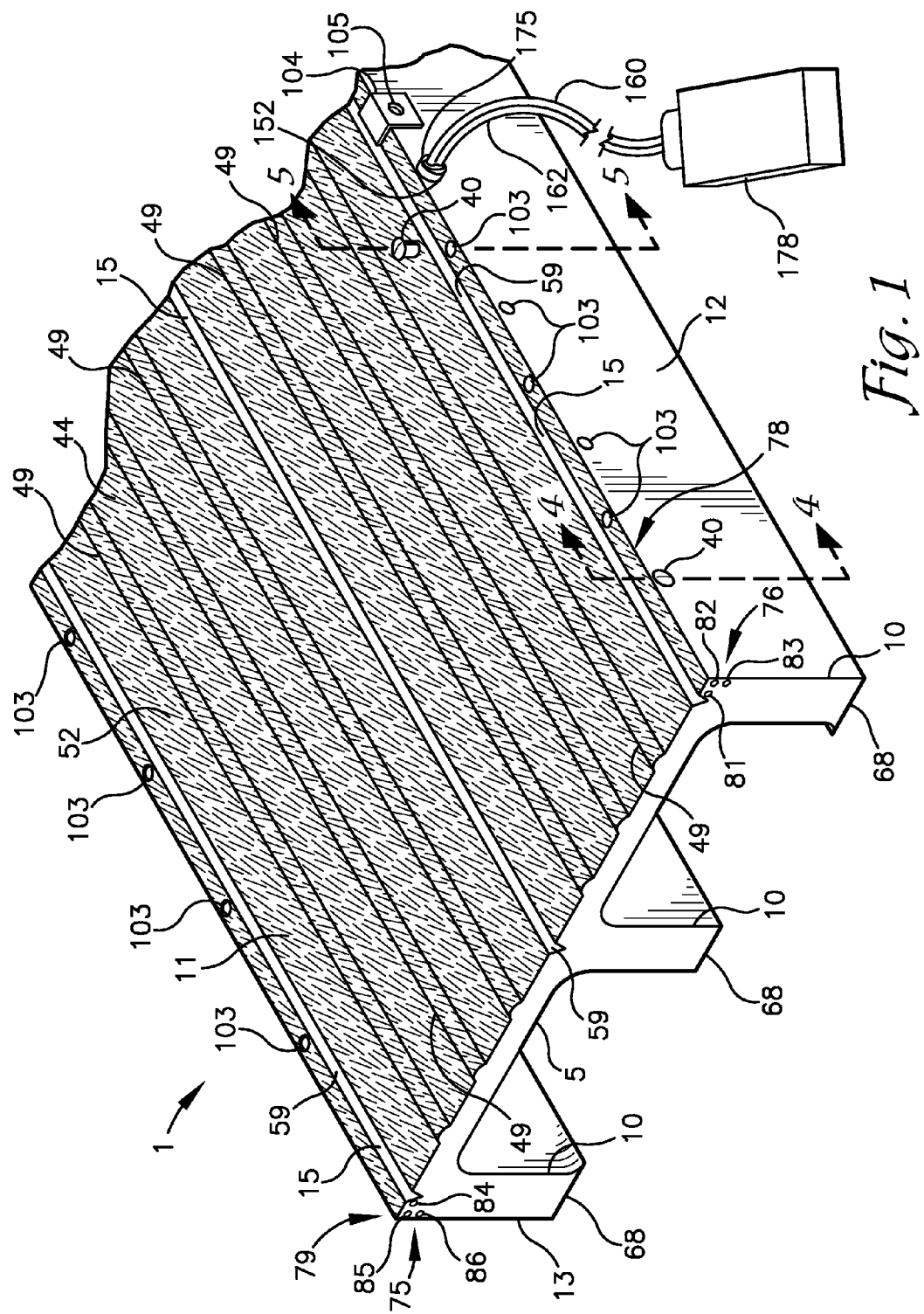
FIG. 1 is a perspective view of a board made of composite material.
Figure 2:
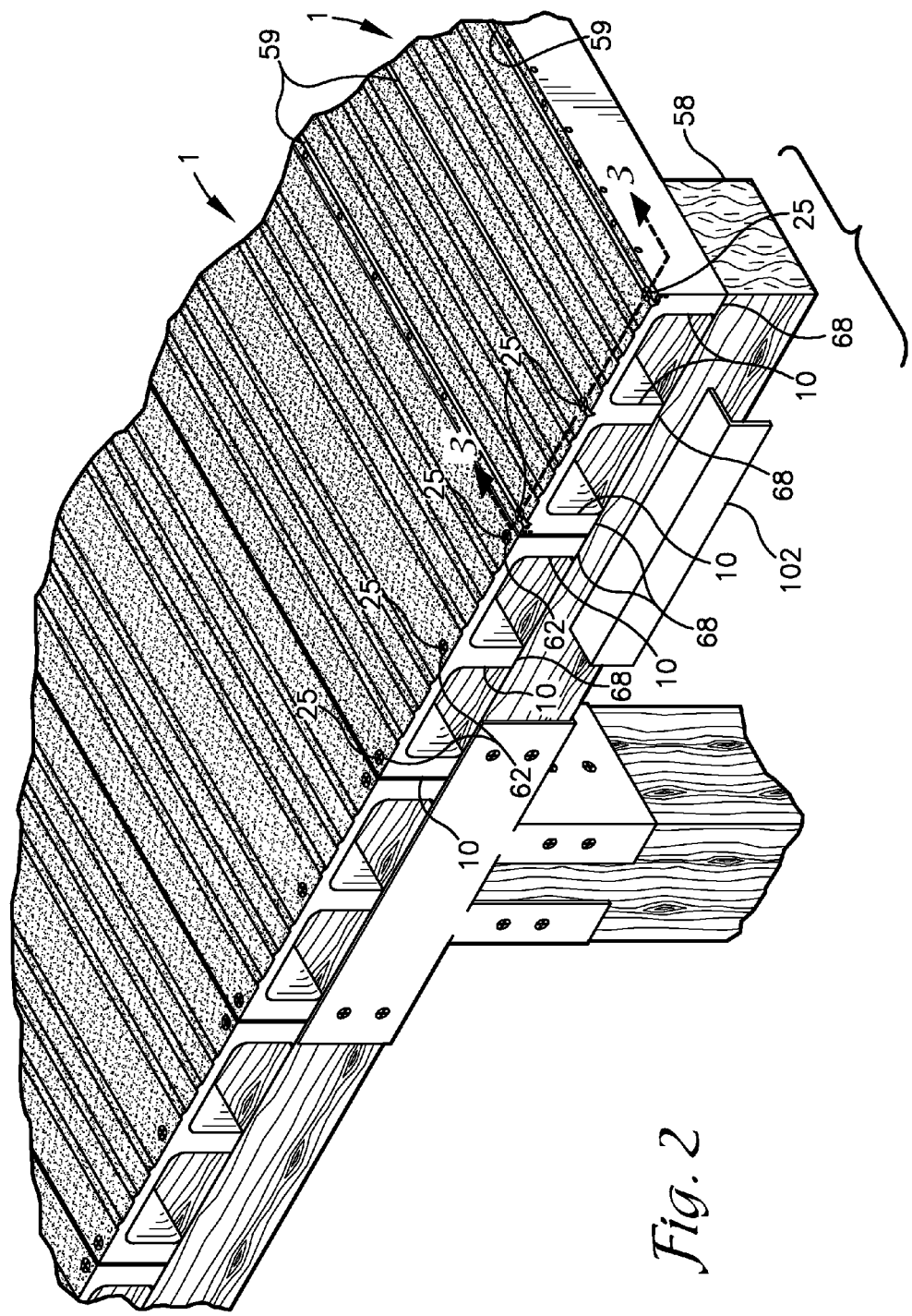
FIG. 2 is a perspective view of the board in FIG. 1 installed alongside additional embodiments of the invention not having integral electrical wiring.
Figure 3:
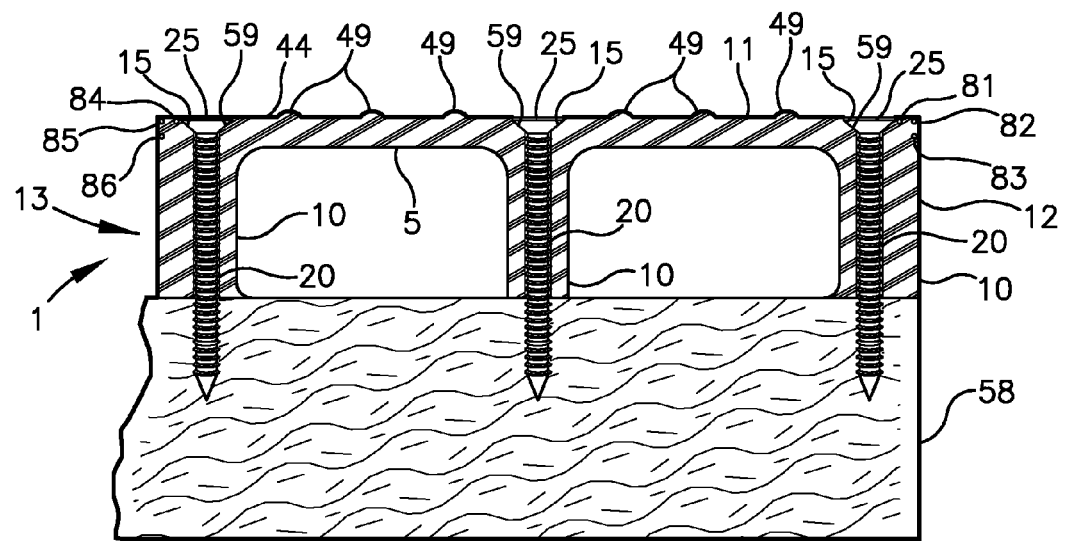
FIG. 3 is a fragmentary, cross-sectional view of the board taken along line 3-3 of FIG. 2.

Referring to the drawings in more detail, reference numeral 1 refers to a composite board or plank with FIG. 1 showing a fragmentary, perspective view of the composite board 1. The board 1 shown comprises an upper plank section 5 and several elongated supports 10 or depending legs integrally formed with and projecting downward from the underside of the plank section 5 in parallel spaced relationship relative to each other. The board 1 is particularly well adapted for use as decking as shown in FIGS. 1 through 3 in which an outer face 11 of the board 1 is oriented upwards and the board 1 includes opposite sides 12 and 13 extending along outer sides of the upper plank section 5 and the outer surface of outer legs 10.

The plank section 5 has a plurality of cavities or recesses 15 formed therein for receiving a fastener 20. A fastener head 25 can be recessed into each cavity 15 to allow for a relatively planar surface atop the board. Board 1 further comprises sets or bundles of electrical wires or conductors 29 embedded within the board proximate one or more longitudinal corners of the board 1 to serve or provide power to electrically powered devices such as lights 40 attached to the board.

In the embodiment shown, board 1 is constructed of fiber reinforced polymer (FRP), which is occasionally referred to as fiberglass. Board 1 is formed using a pultrusion process. In a pultrusion process, reinforcing fibers or matting are pulled through a vat of resin and then through a heated die where the resin is cured or set. A benefit of using this process to manufacture board 1 is that the board may be easily fabricated to any desired length simply by cutting at any location desired as it is being pultruded.

Plank 5 is a relatively thin and flat portion of board 1 which runs the length of the board and spans the width of the board. Plank 5 comprises a generally planar upper surface or face 44. Face 44 is the largest planar surface on plank 5 and when the board is installed horizontally as shown in FIG. 2, face 44 will be facing upward. If board 1 is used as part of a deck or walkway, face 44 is the part of the board that is walked on.

Face 44 may include longitudinally extending ridges 49 to assist with creating traction on the face. The ridges 49 shown are semi-circular in cross-section or semi-cylindrical in shape and form a rounded protrusion extending above the generally flat surface of face 44 proximate each ridge 49. Because the ridges 49 extend above the flat surfaces of face 44, people or objects traveling along face 44 engage the ridges to improve traction. Ridges 49 are preferably formed integral to plank 5 during the pultrusion process such that the ridges extend the length of board 1. The number of ridges 49 created will depend on the size of board 1 and specifically the size of face 44. In the embodiment shown, board 1 includes six ridges 49. As shown in FIG. 1, board 1 is configured such that each half of face 44 has three ridges 49 spaced apart by approximately three quarters of an inch between each ridge. A skid-resistant coating 52 may also be applied to face 44 to improve traction on the face. Coating 52 may comprise a bonding ingredient and a texture ingredient such as rubber granules. Coating 52 may be painted or sprayed on face 44 as a liquid and then allowed to dry to form a textured surface. One embodiment of coating 52 comprises a composition that is commonly used to create roll-on textured truck bed liners.

Plank 5 further comprises a plurality of recesses 15 formed therein to accept fasteners 20. Recesses or grooves 15 are formed on the face 44 side of plank 5 and each recess 15 is defined by walls 55 extending inward from face 44. Each recess 15 is configured to receive the head 25 of a fastener 20 completely therein. Fastener head 25 may be the head of a screw, nail, bolt or other similar fastener 20. The purpose of recesses or grooves 15 is to allow the heads 25 of fasteners 20, which are securing board 1 to a frame 58 or other mounting surface, to be recessed within the recesses 15 at or below the level of face 44. By allowing fastener heads 25 to be recessed at or below face 44, the face will have a more uniformly planar appearance and the fastener heads will not create obstacles or snags to people walking on or objects supported on face 44.

In the embodiment shown in FIG. 1, recesses 15 take the form of longitudinally extending v-shaped grooves 59 running the length of face 44. Board 1 shown in FIG. 1 has three grooves 59 arranged such that one groove is located in the middle of face 44 and the other grooves are each located proximate a longitudinal periphery of face 44. Recesses 15 may also take the form of countersunk holes 62 as shown in FIG. 2. The locations of recesses 15 generally correlate with locations of supports 10 which are discussed below. If countersunk holes are used for recesses 15, the recesses may be located proximate each end of plank 5 or any other location along the length of board 1 where the board is likely to engage a frame 58. Variations of recesses 15 are foreseen such as grooves or holes having different shapes and cross sections, for example squared u-shaped grooves. It is also foreseen that in some instances grooves 59 may not run the entire length of face 44 or that the grooves may run in different directions on face 44 such as transversely or diagonally. The number of recesses 15 and locations of the recesses 15 can vary depending on the intended use or application of board 1.

The elongated supports 10 integrally formed on the bottom of plank 5 may also be referred to as support rails or support legs. The board 1 shown in FIG. 1 has three support legs 10; one support leg 10 is located in the middle of plank 5 and the other support legs 10 are each located proximate a longitudinal periphery of plank 5. Support legs 10 are used to connect the board 1 to a mounting structure or frame 58. Each support leg 10 runs the length of board 1 which is also the length of plank 5. Each support leg 10 has a bottom surface 68, a portion of which will be supported on frame member 58. Support legs 10 also serve as stiffeners to limit the flexing of plank 5 when objects move across face 44. Each support leg 10 provides thickness to board 1 which adds structural reinforcement to the relatively thin plank 5. Support legs 10 also hold plank 5 away from the frame 58 when board 1 is secured to the frame, which may be desirable for aesthetics or other reasons.

Each fastener head receiving recess 15 is positioned over or vertically aligned, centrally relative to one of the support legs 10. As shown in FIG. 3, each fastener 20 extends through recess 15 then through plank 5 and support leg 10 to secure board 1 to frame 58. A portion of the threaded shank of fastener 20 is enclosed within support leg 10 as the shank extends through the support leg 10. In the preferred embodiment, the longitudinal axis of fastener 20 is oriented perpendicular to face 44 however it is foreseen that the fastener could also be angled with respect to face 44 and extend through support leg 10 and into frame 58 at such an angled orientation. Also in the preferred embodiment, each leg 10 will have at least one fastener 20 within it when board 1 is secured to frame 58, however it is foreseen that some applications would not require a fastener 20 in every leg 10. Certain embodiments of board 1 may also comprise a leg 10 that varies in height from other legs and therefore some support legs may not extend all the way from plank 5 to frame 58 when board 1 is secured to frame 58. Also, it is foreseen that board 1 may comprise more or less than three support legs 10 depending on the size of board 1.

Figure 4:
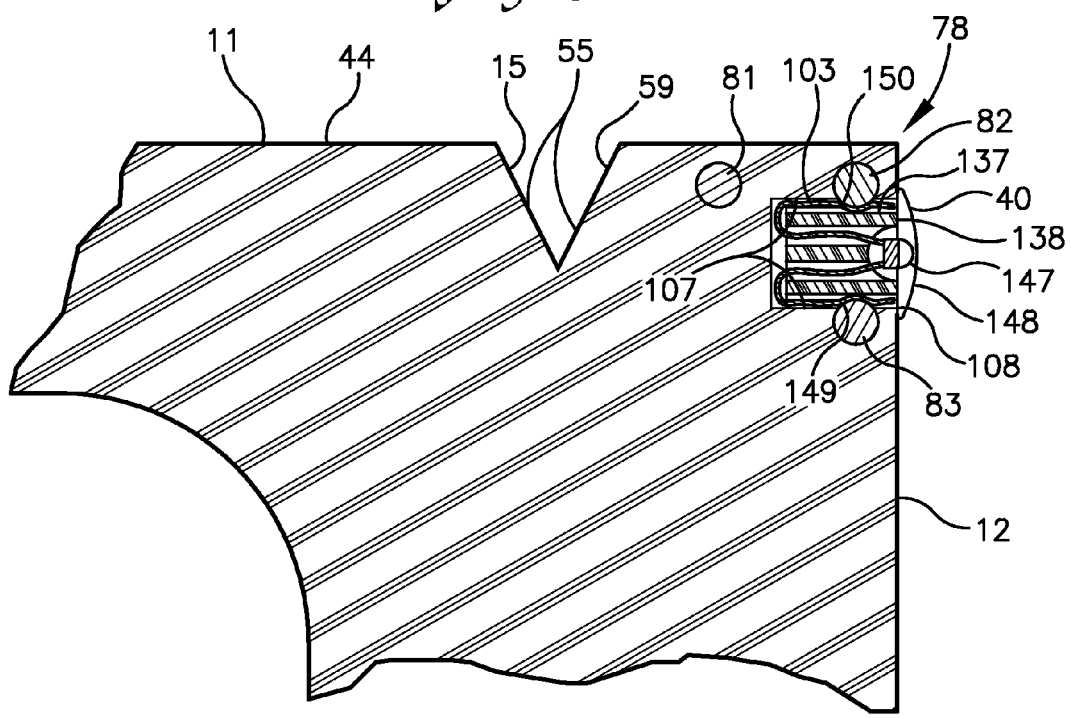
FIG. 4 is a greatly enlarged and fragmentary, cross-sectional view of the board showing a light installed in a socket formed in the side of the board taken along line 4-4 of FIG. 1.
Figure 5:
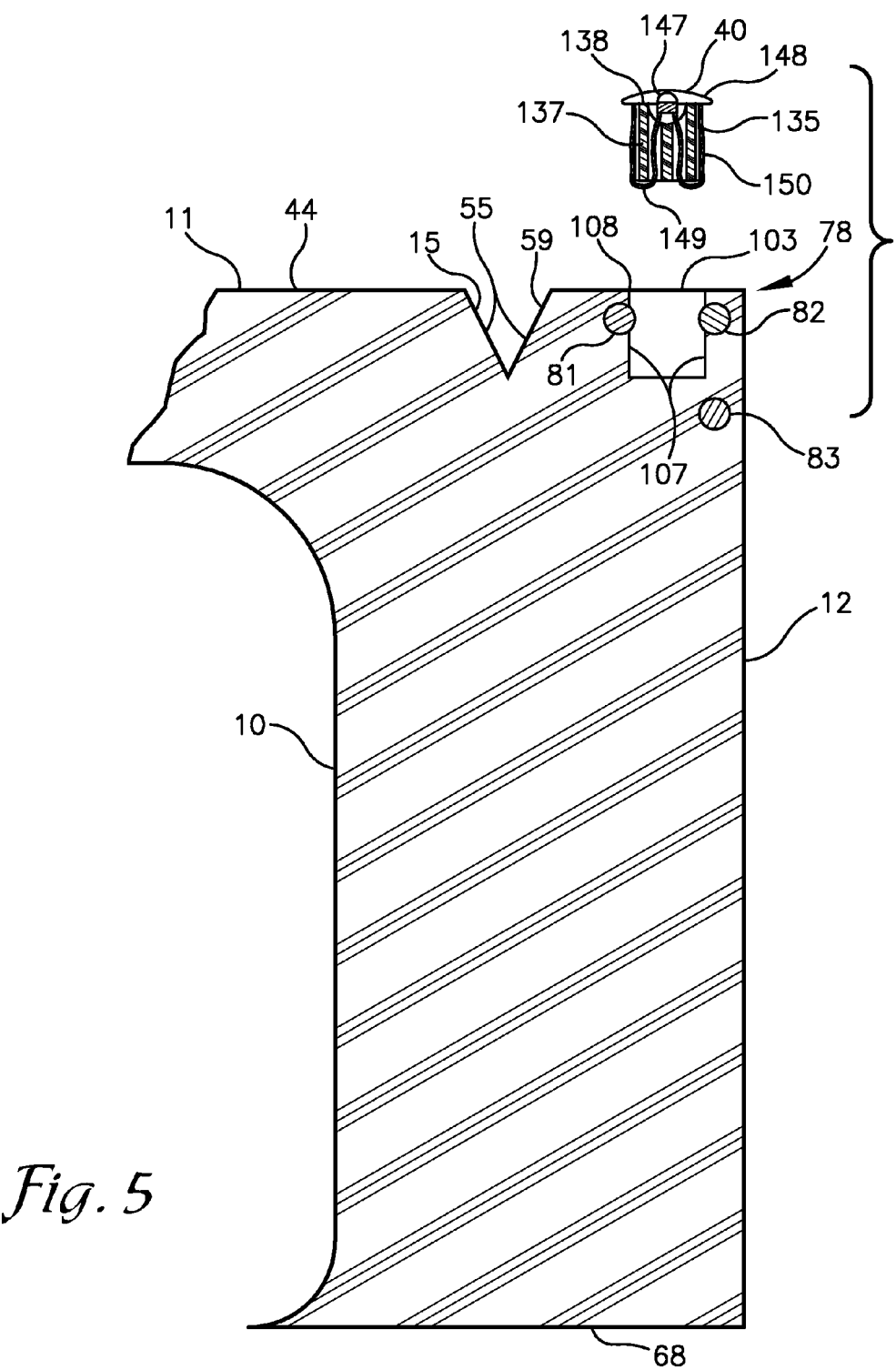
FIG. 5 is a greatly enlarged and fragmentary, cross-sectional view of the board showing a light exploded out from a socket formed in the top of the board taken along line 5-5 of FIG. 1.
Figure 6A:
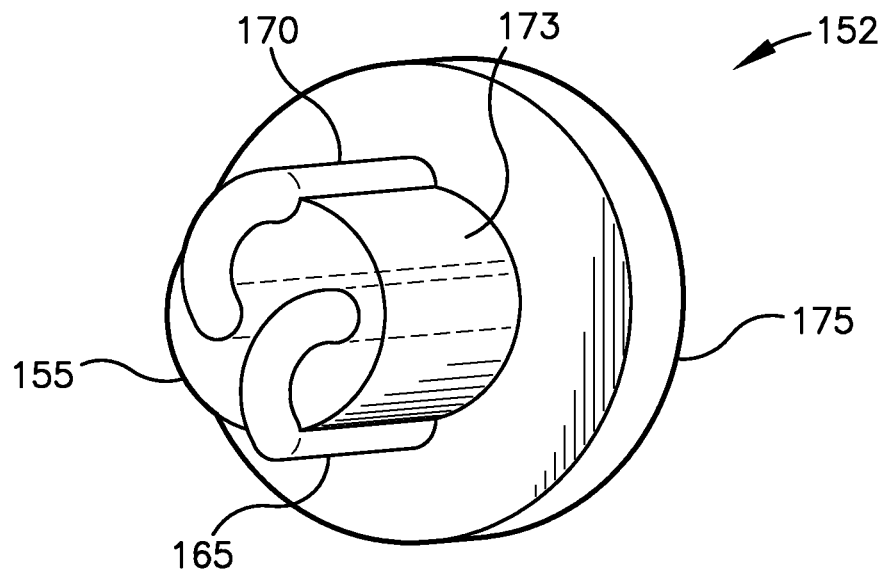
FIG. 6a is a greatly enlarged perspective view of a power supply clip.
Figure 6B:
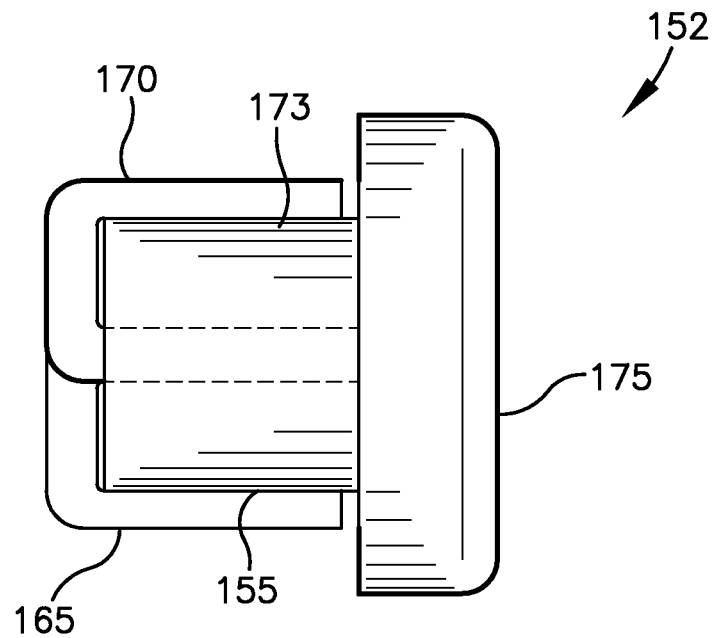

As best seen in FIGS. 1, 4 and 5, board 1 may include sets of electrical conductors embedded in and running the length of the plank 5. The embodiment shown includes first and second sets of electrical conductors 75 and 76 each located proximate a longitudinal corner 78 and 79 of plank 5 formed between the outer surface 11 and each of the sides 12 and 13 respectively. The first set of conductors 75 includes first, second and third conductors 81, 82 and 83 arranged in a right triangle pattern with the second or corner conductor 82 located in close proximity to the first corner 78 of the plank 5. First or inwardly spaced conductor 81 is spaced inward from corner conductor 82 with the longitudinal axes of the conductors 81 and 82 extending in a plane that is generally parallel to the upper or outer face 44 of board 1. Third or downwardly spaced conductor 83 is spaced below corner conductor 82 with the longitudinal axes of the conductors 82 and 83 extending in a plane that is generally parallel to the outer side 12 of the board 1. The spacing between conductors 81 and 82 and between conductors 82 and 83 is sufficient for insertion of a plug therebetween as discussed hereafter. The preferred spacing between upper surface 44 and conductors 81 and 82 and the spacing between side 12 and conductors 82 and 83 is relatively small, typically no more than approximately one quarter of an inch and preferably no more than the diameter of each of the conductors 81-83.

The second set of conductors 76 includes fourth, fifth and sixth conductors 84, 85 and 86 which are arranged relative to corner 79 similar to the arrangement of conductors 81, 82 and 83 relative to corner 78. It is also foreseen that the sets of conductors may be limited to two conductors each arranged parallel to the upper surface 11 or a respective side 12 or 13. It is also to be understood that board 1 may not have any electrical conductors. The conductors may comprise metallic wires or rods for conducting electricity. The conductors 81-86 carry low voltage DC current to power electrical apparatus such as lighting, speakers, weather sensors and the like mounted to board 1.

In the embodiment shown conductors 81-86 are round but they may be flattened to reduce the size of any bulges or the like formed by displacement of fiberglass material around the conductors. It is to be understood that the conductors could have planar, parallel front and rear surfaces with rounded upper and lower edges. It is also foreseen that the wire could have an ovate cross-section. The gauge or diameter of the wires used for conductors 81-86 may vary depending on the type and number of devices being powered, and the amount of electrical power being conveyed by the conductors. Conductors 81-86 may or may not require an electrically insulating sheathing depending on the application of board 1 and the specific type of composite material used to fabricate the board. Also, an end piece 102 may be used to insulate the exposed ends of the conductors at the ends of board 1. End piece 102 is a piece of electrically insulated material formed at right angle. End piece 102 is designed to cover the end of plank 5 so that the ends of conductors 81-86 are not exposed, as well as providing an aesthetically pleasing finished look for board 1. End pieces 102 may be secured to the ends of boards 1 with fasteners such as nails or screws or adhered in place with an adhesive. It is foreseen that in some instances an end piece may not be installed on the board such as if the end of the board abuts other objects or if the board does not require electrical insulation of conductors.

Access to the conductors for electrically connecting an electrical apparatus thereto is accomplished by forming sockets 103 into board 1. The sockets extend into board 1 and between two of the three conductors 81-86, exposing a sufficient portion of the conductors to form an electrical connection between the conductors and the apparatus to be powered. The number of sockets 103 can vary depending on the type and quantity of apparatuses being connected to board 1. Also, the sockets 103 may be positioned on the side of board 1, the top of board 1, or both the side and top of the board as shown in FIG. 1.

Sockets 103 may be formed in board 1 by the manufacturer as well as a person using the board. Because alignment of socket 103 with respect to conductors 81-86 is critical, a jig 104 may be used to form the sockets 103 in the location necessary to expose conductors 81 and 82, or 82 and 83 or 84 and 85 or 85 and 86. Jig 104 is formed at a right angle so that it fits over a corner 78 or 79 of board 1. When jig 104 is placed on a longitudinal corner 78 or 79 of plank section 5 as shown in FIG. 1, guide hole 105 through the jig identifies the proper location to create a socket 103 so that the socket is properly aligned with the conductors. Jig 104 can be used to create sockets at any point along a longitudinal corner 78 or 79 of plank 5.

The apparatus to be installed may include lights 40 similar to the plug light assembly disclosed in my prior U.S. Pat.

No. 7,810,277, the disclosure of which is incorporated herein by reference. A primary difference between lights 40 and the plug light assembly disclosed in the '277 patent is that lights 40 do not require a cap to secure the lights to board 1. Light 40 frictionally engages the walls 107 of socket 103 and relies on friction to stay secured to board 1. Also, light 40 is recessed within socket 103 such that the light extends only slightly past the outer rim 108 of the socket.

Each light 40 includes a body 135 including a plug or plug shaft 137 which projects rearwardly from a rim 138. The plug 137 is sized for insertion in one of the sockets 103 to frictionally engage a portion of the walls 107 of the socket 103. The plug 137 is generally round in cross-section although other shapes are possible depending on the shape of socket 103. A light bulb 147 is secured to plug 137 and a generally circular lens 148 covers the bulb. Lens 148 has a flattened dome shape and attaches to rim 138 of plug 137. Lens 148 overhangs plug 137 such that lens 148 abuts the outer rim 108 of socket 103 to prevent light 40 from being inserted too far into socket 103. The overhanging portion of lens 148 also serves as a grip to assist in removal of light 40 from socket 103.

Electrical leads 149 and 150 extend from the light bulb 147, through plug 137 and back around sides of the plug for engagement with two of the electrical conductors 81-86 when the plug 137 is inserted in one of the sockets 103. The plug 137 is inserted in one of the sockets 103 with the plug 137 oriented so that the exposed electrical leads 149 and 150 engage the two exposed conductors in socket 103 to form an electrical contact with the conductors. The lightbulb 147 may be of a variety of types including incandescent or LED. The shape of socket 103, plug 137 and lens 148 may vary, and it is foreseen that the shape of lens 148 may differ from the shapes of socket 103 and plug 137 to which the lens is attached (for example a square shaped lens may be used with a round socket and plug).

Electrical power is delivered to the board using a power supply clip 152 press fit into a socket 103 similar to that shown in U.S. Pat. No. 7,810,277. Like the light 40, the power supply clip 152 does not utilize a cap and the clip is held in place due to friction between the clip and walls of socket 103. The power supply clip 152 includes a plug or plug shaft 155 which is generally round in cross-section. Wires or leads 160 and 162 are routed through the plug 155 and exposed portions 165 and 170 of each lead 160 and 162 are bent back over and across an outer surface 173 of the plug to engage two of the electrical conductors 81-86 when the power supply clip 152 is inserted in one of the sockets 103. Power supply clip 152 includes a circular cap 175 which abuts the outer rim 108 of socket 103 to keep the clip from being inserted too far into the socket.

With the power supply clip 152 pressed into socket 103, electricity can pass from a power source 178 through the leads 160 and 162 on the plug to conductors 81-86, then to a light 40 to power the light. The power supply clip can be molded from any non-conducting material such as plastic, fiberglass, rubber or polyester.

It is to be understood that the lights 40 may only be installed in selected boards 1 used to create a structure depending on the need or benefits in illuminating a portion of the structure. For example, lights 40 may be installed in the corner of a board 1 forming the leading edge of a step to help illuminate the step. Lights 40 may be installed in the boards 1 extending along the outer periphery of the structure built such as a deck to delineate the edge of the deck.

Boards 1 or building members formed as disclosed herein may include a wide variety of dimensions and relative sizes. In the embodiment shown, which is particularly well adapted for decking, the board 1 may be approximately four to six inches wide and one and one half inches to two inches tall.

It is to be understood that while certain forms of the present invention have been illustrated and described herein, it is not to be limited to the specific forms or arrangement of parts described and shown.

Having thus described the invention, what is claimed as new and desired to be secured by Letters Patent is as follows:

1. A board formed from a fiber reinforced resin including:
   a plank portion having an outer surface and first and second legs projecting downward from an underside of said plank portion when said outer surface is oriented facing upwards; said first and second legs extending in parallel spaced relationship relative to each other and extending lengthwise relative to said plank portion; said board further including first and second grooves formed in said plank portion, said first and second grooves extending above and in vertical alignment with said first and second legs respectively and extending lengthwise relative to said plank portion, each of said first and second grooves sized to receive a head of a fastener driven through said first or second leg in alignment with said respective first or second groove.

2. The board as in claim 1 wherein said first and second grooves are v-shaped.

3. The board as in claim 1 further comprising at least two electrical conductors embedded in said plank portion in parallel spaced relationship and extending the length of said board.

4. The board as in claim 1 further comprising at least two electrical conductors embedded in and extending the length of said plank portion in parallel spaced relationship proximate a corner of said plank portion extending along the outer surface thereof.

5. The board as in claim 1 further comprising first, second and third electrical conductors embedded in and extending the length of said plank portion proximate a corner of said plank portion extending along the outer surface thereof; said first and second electrical conductors extending in parallel spaced relationship in a first plane generally parallel to the outer surface of said plank portion; said second and third electrical conductors extending in parallel spaced relationship in a second plane generally parallel to a side of the plank portion with the second plane extending generally perpendicular to the first plane and the spacing between the second and third conductors matching the spacing between the first and second conductors.

6. A board formed from a fiber reinforced resin including an outer surface and first and second sides and having first, second and third electrical conductors embedded therein and extending the length of said board proximate a first corner of said board between said outer surface and said first side; said first and second electrical conductors extending in parallel spaced relationship in a first plane generally parallel to the outer surface of said board; said second and third electrical conductors extending in parallel spaced relationship in a second plane generally parallel to said first side of said board with the second plane extending generally perpendicular to the first plane and the spacing between the second and third conductors matching the spacing between the first and second conductors.

7. The board as in claim 6 further comprising fourth, fifth and sixth electrical conductors embedded therein and extending the length of said plank portion proximate a second corner of said board between said outer surface and said second side; said fourth and fifth electrical conductors extending in parallel spaced relationship in the first plane generally parallel to the outer surface of said board; said fifth and sixth electrical conductors extending in parallel spaced relationship in a third plane generally parallel to said second side of said board with the third plane extending generally perpendicular to the first plane and the spacing between the fifth and sixth conductors matching the spacing between the fourth and fifth conductors.

8. The board as in claim 6 in combination with a jig including first and second legs extending in perpendicular relationship and a guide hole extending through said second leg, said first leg positionable against said first corner with said first leg engaging said first side of said board such that said second leg is positioned with said guide hole aligned between said first and second conductors or said first leg engages said outer surface of said board such that said second leg is positioned with said guide hole aligned between said first and second conductors.

9. The board as in claim 6 further comprising a recess formed in said outer surface of said board and sized to receive the head of a fastener therein.

10. The board as in claim 9 wherein said recess comprises a groove running the length of said board.

11. The board as in claim 6 comprising a plurality of grooves formed in said outer surface of said board and extending the length of said board, said groove sized to receive the head of a fastener therein.

12. The board as in claim 6 further comprising a plurality of ridges formed on said outer surface and extending the length of the board.

13. A board formed from a fiber reinforced resin including a plank portion having an outer surface and at least two legs projecting downward from said plank portion when said outer surface is oriented facing upwards, said at least two legs extending lengthwise relative to said plank portion and a groove formed in said plank portion above each of said at least two legs and extending lengthwise relative thereto, said groove sized to receive a head of a fastener driven through said leg in alignment with said groove; said board further comprising at least two electrical conductors embedded in said plank portion in parallel spaced relationship and extending the length of said board.

14. The board as in claim 13 wherein said at least two electrical conductors extend proximate a corner of said plank portion extending along an outer surface thereof.

* * * * *